US011055397B2

(12) United States Patent
Pham et al.

(10) Patent No.: US 11,055,397 B2
(45) Date of Patent: Jul. 6, 2021

(54) METHODS, MEDIUMS, AND SYSTEMS FOR ESTABLISHING AND USING SECURITY QUESTIONS

(71) Applicant: Capital One Services, LLC, McLean, VA (US)

(72) Inventors: Vincent Pham, Champaign, IL (US); Austin Grant Walters, Savoy, IL (US); Jeremy Edward Goodsitt, Champaign, IL (US); Fardin Abdi Taghi Abad, Champaign, IL (US); Anh Truong, Champaign, IL (US); Kate Key, Effingham, IL (US); Kenneth Taylor, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 84 days.

(21) Appl. No.: 16/597,830

(22) Filed: Oct. 9, 2019

(65) Prior Publication Data

US 2020/0110872 A1 Apr. 9, 2020

Related U.S. Application Data

(63) Continuation of application No. 16/294,297, filed on Mar. 6, 2019, now Pat. No. 10,482,236, which is a
(Continued)

(51) Int. Cl.
*G06F 21/45* (2013.01)
*H04L 9/32* (2006.01)
(Continued)

(52) U.S. Cl.
CPC ............ *G06F 21/45* (2013.01); *G06F 21/602* (2013.01); *G06F 21/6227* (2013.01);
(Continued)

(58) Field of Classification Search
CPC .... G06F 21/45; G06F 21/6227; G06F 21/602; H04L 9/3226; H04L 9/3239; H04L 2209/38
See application file for complete search history.

(56) References Cited

U.S. PATENT DOCUMENTS 6,829,708 B1 * 12/2004 Peinado ................. G06F 21/71
713/156
9,390,450 B1 * 7/2016 Hart .................... H04L 67/1097
(Continued)

*Primary Examiner* — Darren B Schwartz
(74) *Attorney, Agent, or Firm* — Kacvinsky Daisak Bluni PLLC

(57) ABSTRACT

Exemplary embodiments relate to the secure storage of security questions through an immutable log, such as a blockchain. The security questions may be stored in a centralized location, accessible from an application or browser tab running on the user's device. When a security question is required, such as to perform a password reset on a website, the website may interact with the application or browser tab, which retrieves the question(s) from the blockchain. The user may enter their answers to the question(s), which may be hashed by the application or tab. The hashed answers may be entered into the original requesting website, which may verify with the blockchain that the correct answers have been provided. Thus, the requesting website sees neither the questions nor the answers. Additional security features may include logging requests for questions, so that a user can determine if a security question may have been compromised.

17 Claims, 11 Drawing Sheets

Related U.S. Application Data continuation of application No. 16/153,164, filed on Oct. 5, 2018, now Pat. No. 10,268,817.

(51) Int. Cl.
   *G06F 21/62* (2013.01)
   *G06F 21/60* (2013.01)

(52) U.S. Cl.
   CPC .......... *H04L 9/3226* (2013.01); *H04L 9/3239* (2013.01); *H04L 2209/38* (2013.01)

(56) References Cited

U.S. PATENT DOCUMENTS

| | | | | |
|---|---|---|---|---|
| 10,623,401 B1* | 4/2020 | Yager | | G06F 21/316 |
| 10,719,830 B1* | 7/2020 | Fisi | | G06Q 20/381 |
| 2005/0039056 A1* | 2/2005 | Bagga | | G06F 21/31 |
| | | | | 726/19 |
| 2005/0187934 A1* | 8/2005 | Motsinger | | H04L 63/107 |
| 2007/0022300 A1* | 1/2007 | Eppert | | H04L 63/08 |
| | | | | 713/183 |
| 2007/0107051 A1* | 5/2007 | Carter | | G06F 21/6218 |
| | | | | 726/21 |
| 2007/0199053 A1* | 8/2007 | Sandhu | | H04L 9/0825 |
| | | | | 726/4 |
| 2008/0134317 A1* | 6/2008 | Boss | | G06F 21/31 |
| | | | | 726/18 |
| 2009/0241201 A1* | 9/2009 | Wootton | | G06F 21/31 |
| | | | | 726/28 |
| 2011/0307705 A1* | 12/2011 | Fielder | | G06F 21/6209 |
| | | | | 713/181 |
| 2011/0314518 A1* | 12/2011 | Ding | | H04L 41/0806 |
| | | | | 726/4 |
| 2012/0216260 A1* | 8/2012 | Crawford | | G06F 21/31 |
| | | | | 726/5 |
| 2014/0007242 A1* | 1/2014 | Carter | | H04L 63/1433 |
| | | | | 726/25 |
| 2016/0072792 A1* | 3/2016 | Hu | | G06F 21/31 |
| | | | | 726/7 |
| 2016/0182481 A1* | 6/2016 | Audsin | | H04L 63/102 |
| | | | | 726/6 |
| 2016/0315929 A1* | 10/2016 | Childress | | H04W 12/06 |
| 2017/0033936 A1* | 2/2017 | Cidon | | H04L 9/3271 |
| 2017/0109390 A1* | 4/2017 | Bradley | | G06F 16/335 |
| 2018/0115416 A1* | 4/2018 | Diehl | | H04L 9/0838 |
| 2018/0158054 A1* | 6/2018 | Ardashev | | G06Q 20/389 |
| 2019/0044741 A1* | 2/2019 | Middleton | | H04L 9/0637 |
| 2019/0079998 A1* | 3/2019 | Rush | | H04L 9/0643 |
| 2019/0097800 A1* | 3/2019 | Melrose | | H04L 9/0825 |
| 2019/0158477 A1* | 5/2019 | Nagaratnam | | G06F 21/31 |
| 2019/0182033 A1* | 6/2019 | Li | | H04L 9/3236 |
| 2020/0073978 A1* | 3/2020 | Dain | | G06F 16/2365 |

* cited by examiner

METHODS, MEDIUMS, AND SYSTEMS FOR ESTABLISHING AND USING SECURITY QUESTIONS

RELATED APPLICATIONS

This application is a Continuation of U.S. patent application Ser. No. 16/294,297, filed on Mar. 6, 2019, which is a Continuation of U.S. patent application Ser. No. 16/153,164, filed on Oct. 5, 2018 (issued as U.S. Pat. No. 10,268,817 on Apr. 23, 2019). The contents of both aforementioned patent applications are incorporated herein by reference in their entireties.

BACKGROUND

Security questions (e.g., "what street did you grow up on?") are often used in computing to provide additional layers of security or to allow a user to reset a forgotten password. Many different entities use the same or similar security questions, but each maintains its own copy of the security questions and a user's answers. If a security question is compromised at one location (e.g., at a news website for which the user has an account), it is possible that a criminal will use the security question to obtain access to another location (such as the user's account with a banking website).

DETAILED DESCRIPTION

Figure 1:
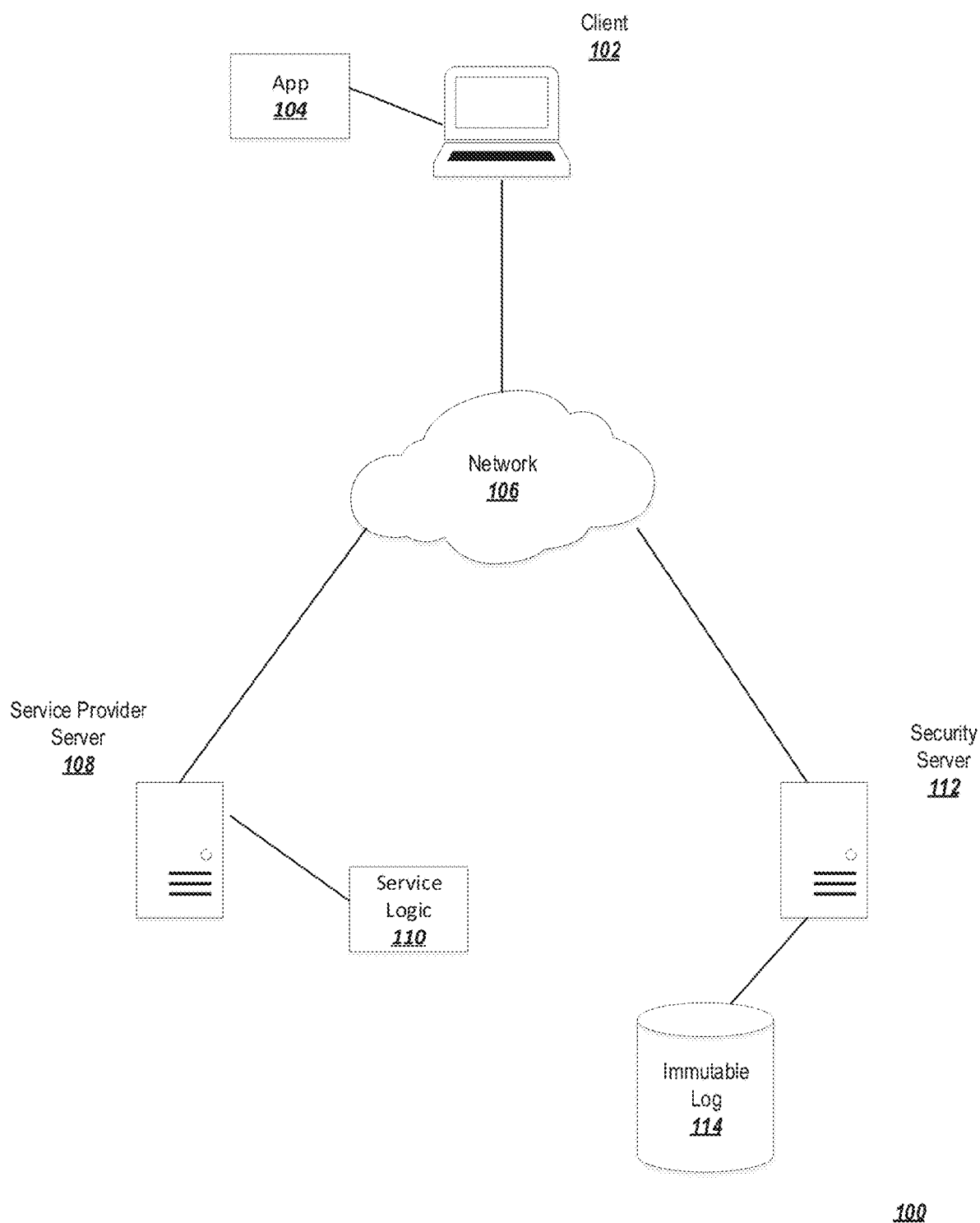
FIG. 1 depicts a system suitable for practicing exemplary embodiments as described herein.

Exemplary embodiments pertain to the secure creation and usage of security questions. The questions may be stored in a centralized location, rather than being distributed at many locations; accordingly, the questions and answers can be better protected. Any entity requiring access to the security question (e.g., the banking website or news website in the examples provided above) can access the centralized, secured location through an intermediary, as described in more detail below.

The questions may be stored at the centralized location in an immutable log, such as a blockchain. The immutable log may provide access to the questions via the intermediary, such as an application or web browser tab specifically configured to interact with the immutable log. For instance, the application or web browser may be configured with a block identifier pointing to a block in the blockchain at which a user's security question is stored.

When a security question is required by a requestor, such as to perform a password reset on a website or to provide additional verification of a user's identity, the requestor may interact with the intermediary, which retrieves the question(s) from the blockchain. The user may enter their answers to the question(s) into the intermediary, which may be hashed before being provided to the original requestor.

The requestor may verify with the immutable log that the correct answers have been provided. Thus, the requesting website sees neither the questions nor the answers, thereby providing additional security for the questions and answers.

Each time a security question is created or used, this information may be stored with the security question's record in the immutable log. Users may request, for example, the time or location of their last use of the security question. If the security question has been used or altered at a time not recognized by the user, this may signify that the security question has been compromised (or, at least, that someone has attempted to compromise the security question). At this point, the user can decide to retire the security question, or to change their answer.

Note that there may be advantages, as noted above, to storing the immutable log and performing processing in a centralized location (e.g., providing fewer locations that can be compromised). Furthermore, centralized embodiments may work well in situations where relatively few service providers are participating in the authentication process. Accordingly, exemplary embodiments described below are largely described from the perspective of a centralized security provider. However, the present invention is not so limited, and embodiments may equally be employed in a decentralized environment (e.g., where the immutable log and/or security processing is distributed across multiple servers and/or client devices). Decentralized embodiments may be useful in situations where a relatively large number of service providers use the secure authentication techniques described herein, because more computing resources may be leverageable. A decentralized embodiment may continue to maintain one immutable log (albeit, in a decentralized configuration, potentially with multiple copies of entries in the log that are synchronized so as to present a common view as though the log were a single entity), which may allow for multiple services to leverage a single source of security questions.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1 depicts an example of an environment 100 suitable for practicing exemplary embodiments.

A client 102 may access a service provided on a service provider server 108 via a network 106. In order to access the service, the client 102 may authenticate with the server 108 by providing (e.g.) a user name and password. The server provider server may implement service logic 110 to provide the service to the client 102.

Under certain circumstances, the user of the client 102 may need to validate their identity with the service provider server 108. This may occur, for example, if the user forgets their password with the service and needs to request that the password be reset. In this case, the service would like to validate that the user is who they claim to be before allowing the user to change the password. A security question or questions may be used for this purpose. In other cases, the service may want to provide additional levels of security in addition to requiring a password. For example, when the user logs in from a new device, the service may request that the user answer security questions in order to validate that the user is who they purport to be.

Problematically, when a service provider stores security questions, on their own servers, the questions can be compromised and used with the service or with other services. Exemplary embodiments address this problem by storing a user's security questions and answers in an immutable log 114 (such as a blockchain) at a security server 112. Each of various service providers may make use of the security questions, as described herein, although according to exemplary embodiments none of the service providers learn the security question or the answers.

Accordingly, the security questions and answers are provided at a centralized location at the security server 112, and are not distributed to various service provider servers 108. This provides for more secure storage of the questions and answers since they can be protected at one location (thus allowing administrators to concentrate security resources). Moreover, when each service provider server 108 maintains its own copy of security questions and answers, bad actors who gain access to the security answers at one service may be able to make use of the answers at other services. Even if a service realizes that it has been compromised and invalidates the security questions, similar security questions may remain active for the user on other services. By concentrating and protecting the questions and answers at one location, which may include invalidating compromised questions once, at the central location, the user's identity can be better protected.

In order to make use of the questions and answers stored in the immutable log 114, the client 102 may implement an application 104 that interacts with the security server 112. In some embodiments, the application 104 may be a background application running on the client 102. Upon receiving a request for validation from the service provider server 108, the application 104 may request the security question (or multiple security questions) from the security server 112. The security server 112 responds to the application request by providing the security question(s) directly to the client 102 (i.e., bypassing the service provider server 108). The application 104 may be configured with capabilities to decrypt information provided by the security server 112 so that the security server 112 can transmit the security question(s) in an encrypted form.

Upon receiving the security question(s), the application 104 may decrypt the question(s) and present them on the client device 102. The user may enter their answer(s) to the security question(s) into an interface provided by, or associated with, the application 104 (e.g., in an interface of the application 104 itself, in a browser tab spawned by the application 104, etc.). The application 104 may encode the answer(s) to the security question(s), such as by hashing the answer(s) and provide the encoded versions of the answer(s) to the user. The user may then enter then encoded answer(s) into an interface associated with the service provider, and the encoded answer(s) may be sent to the service provider server 108. At this point, the service provider server 108 has not seen the original security questions, and can only see the encoded version(s) of the answer(s) (i.e., not the answers themselves). Optionally, if multiple security questions are available, the encoded version of the answer may be transmitted with a tag or identifier allowing the answer to be matched up with the question that prompted the answer.

The service provider server 108 may transmit a validation request to the security server 112 including the encoded version(s) of the answer(s). The security server 112 may validate that the encoded version(s) of the answer(s) corresponds to the answer(s) stored in the immutable log 114. If so, the security server 112 may validate to the service provider server 108 that the user is who they purport to be, and flag the security questions as recently used. If not, the security server 112 may reject the validation request and may flag the security questions as having been recently used; optionally, the security server 112 may also inform the user associated with the security questions that an attempt was recently made, at a particular service provider, to use the security questions to gain access to the user's account. If the user did not attempt to access the account themselves, they might be able to identify that their account is undergoing an attempt at unauthorized access (and take further corrective action).

Exemplary interfaces for performing the above-described procedure are depicted in FIGS. 2A-2H.

Figure 2A:
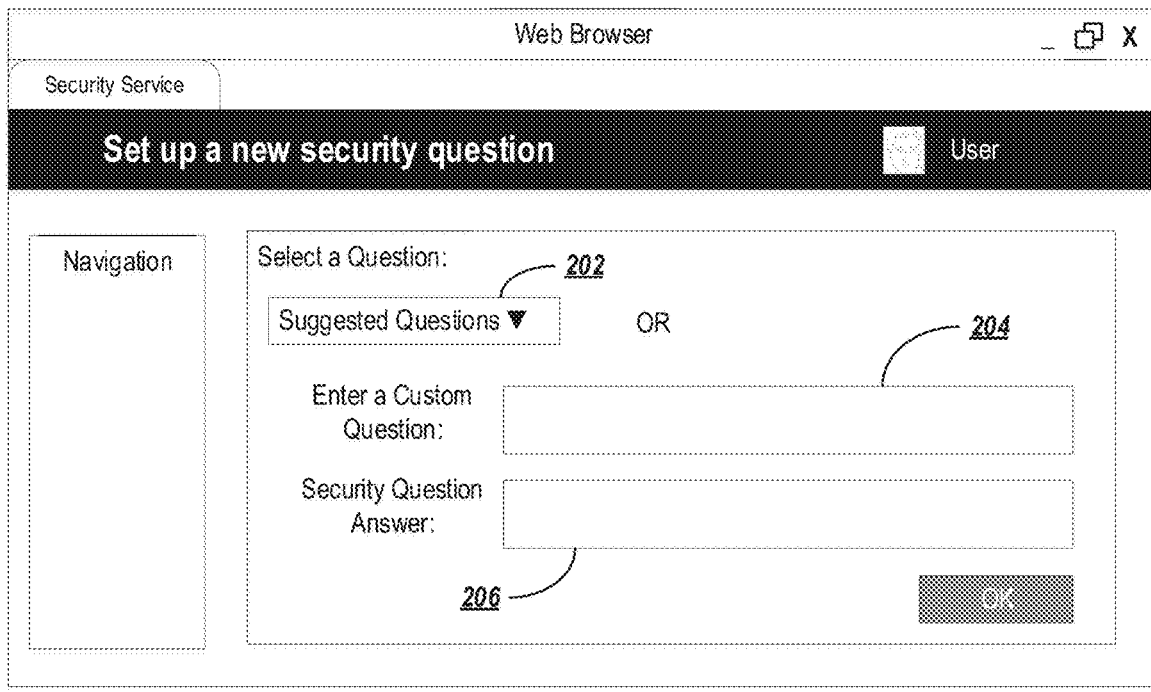
FIGS. 2A-2H depict interfaces suitable for setting up and using a security question according to exemplary embodiments.
Figure 2B:
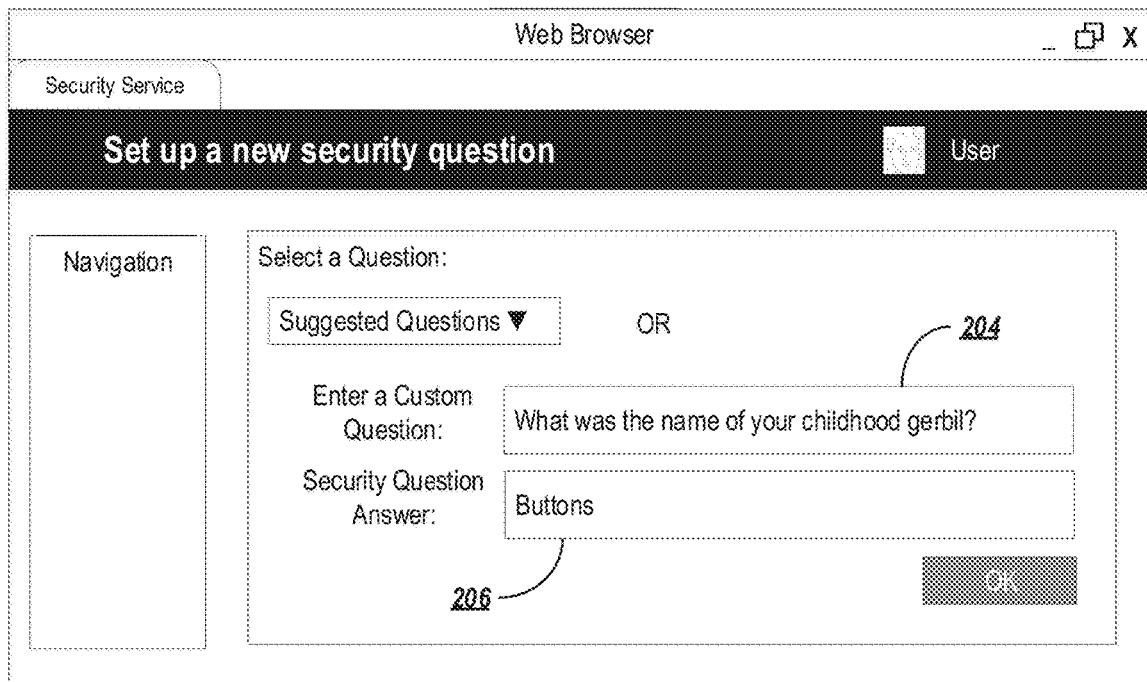
Figure 2C:
Figure 2D:
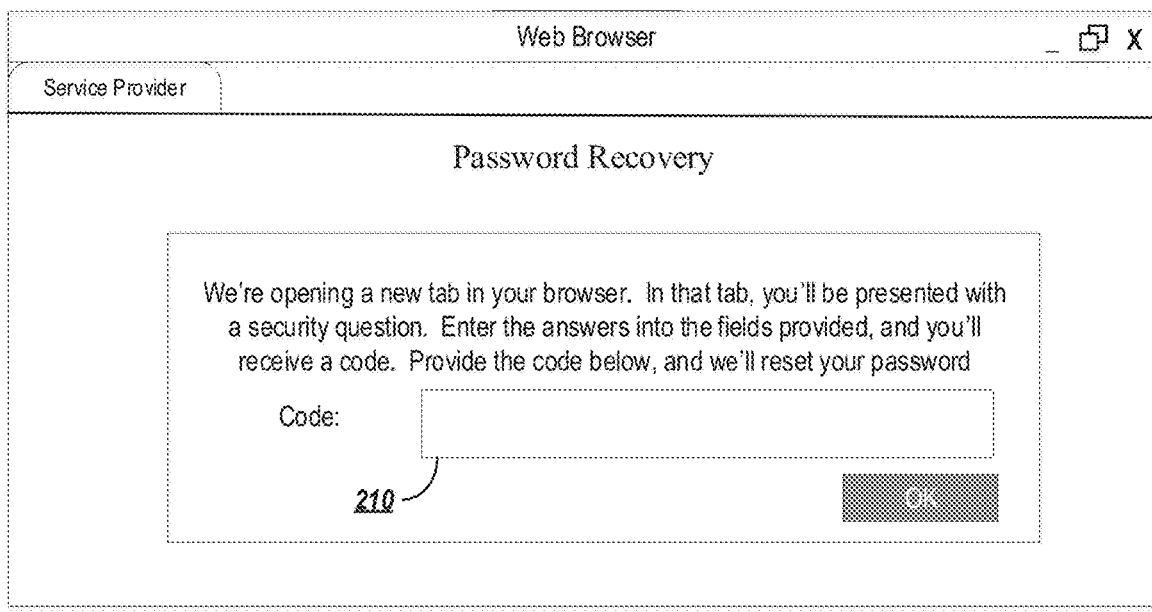

FIG. 2A depicts an exemplary interface 200 associated with the security server 112 and/or application 104, as it is presented on the client 102. The interface 200 allows the user to set up a new security question/answer in the immutable log 114.

The interface 200 includes a drop-down box 202 allowing the user to choose from popular, pre-configured security questions (e.g., "What street did you grow up on," "What is your mother's maiden name," etc.) Optionally, the interface 200 may also provide a custom field 204 into which a user can enter their own (non-preconfigured and customized) security question. The user can enter their answer to the security question in an answer field 206.

Upon entering this information into the interface 200, the application 104 may transmit the question and answer directly to the security server 112 (potentially in an encrypted form) for entry into the immutable log 114. The user may enter as many questions and answers as they wish, as shown for example in FIG. 2B. In some embodiments, users can also retrieve their questions and/or answers from the immutable log 114, and update the log 114 with new information (e.g., a new answer to an existing security question).

Each time a question and answer are created or used, the log 114 creates a new record, as described in more detail in connection with FIG. 3. A record identifier associated with the record may be returned to the application 104. For example, if the log 114 is a blockchain, the log 114 may create a new block in the blockchain, and the block's block identifier may be returned to the application 104. The application 104 may update an internal field with the record identifier so that, in the future, the application 104 knows which record in the immutable log 114 to access when there is a need to validate the user.

At some point, the user may need to validate their identity with a service provider. In one example depicted in FIG. 2C, validation may be used if the user forgets their password and needs to have it reset (although one of ordinary skill in the art will recognize that validation may be used for numerous other purposes). In this case, the service provider's user interface may provide an option 208 to reset the password. Upon selecting the option 208, the service provider may send the user to a password recovery interface (FIG. 2D) of the service provider. The service provider may also inform the application 104 that there is a need to validate the user.

The password recovery interface of the service provider may include a field 210 allowing the user to enter a code associated with the answer to the security question (in one embodiment, a hash of the answer to the security question). The service provider relies on a code, rather than the answer itself, to protect the integrity of the security question and ensure that only the user and the security server 112 are enabled to view the security question/answer.

In order to get the code to enter into the field 210, the application 104 may present a further interface, such as by creating a new web browser tab or presenting an application-specific interface. An example of an interface 212 created in a new browser tab is shown in FIG. 2E.

Figure 2E:
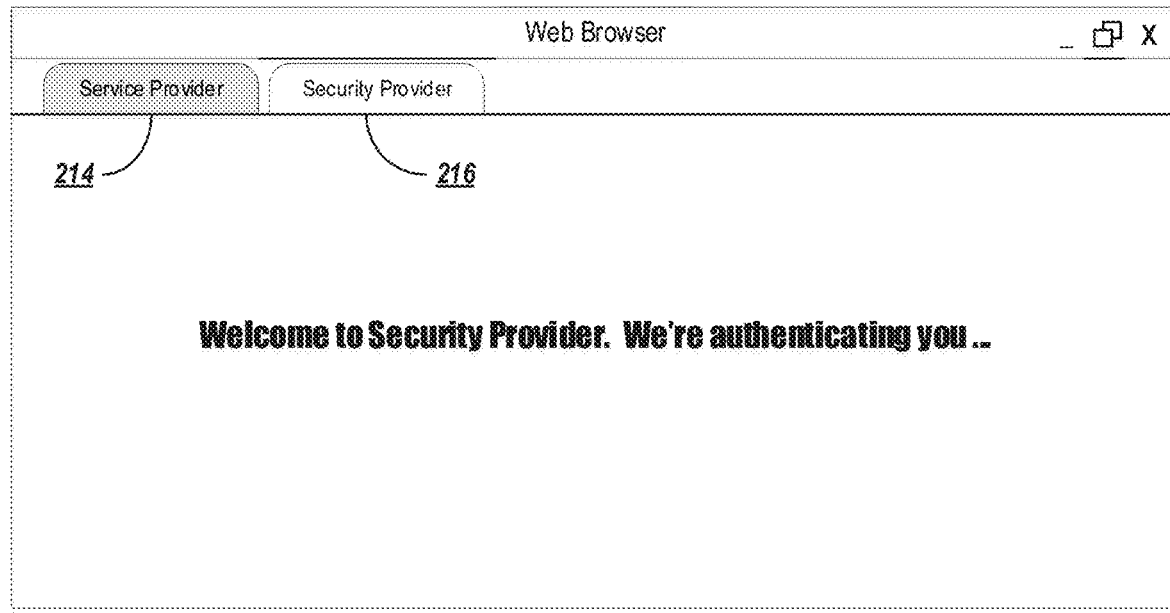

As shown in FIG. 2E, the interface 212 is displayed in a new browser tab 216 distinct from the browser tab 214 of the service provider. Initially, the security provider needs to verify that the user is who they purport to be in order to show the user their security question (although this process may be less involved than having the user enter a password for the security service, which may be undesirable in case the user also forgets their password to the security service). In some embodiments, the system may rely on identifying information, such as the MAC address or electronic serial number (ESN) of the device the user is using to access the interface 212, or (if the user is accessing the interface 212 on a mobile device), the user's phone EID. In some embodiments, the user may provide biometric identifying information, such as a fingerprint scan, iris scan, an image of the user's face, a voice sample, etc. In some embodiments, the system may use location information, such as the location of the user's home or workplace, to authenticate the user when the user is present in that particular location. In some embodiments, the system may rely on multiple devices (e.g., the user's phone, laptop, a spouse's phone, etc.) being present at the same location to verify the user's identity. Preferably, the system may rely on two or more different types of authentication data, if the user's device has been compromised. Accordingly, some combination of device-specific information and user-specific information (such as biometric data) may be used.

Figure 2F:
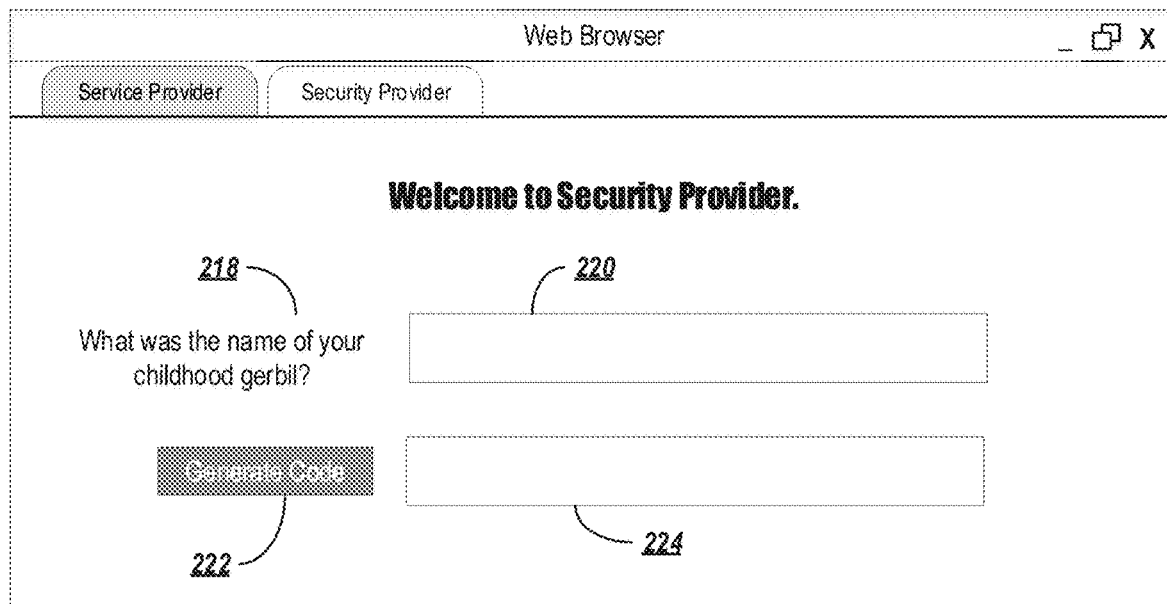

Once the user has been authenticated with the security provider, the application 104 may retrieve the security question from the security server 112 and present the security question in the new browser tab 216 (see FIG. 2F). In this interface, the security question Note that the application 104 may retrieve more than one security question from the server 112 if more than one is available. In some embodiments, the application 104 may retrieve a number of security questions from the server 112 corresponding to a request from the service provider—in other words, the service provider may request that the user be validated using one, two, or more security questions. In other embodiments, the application 104 may support varying levels of user validation, with each level corresponding to more security questions and/or more difficult security questions. For instance, a level 1 validation request may cause the application 104 to retrieve a single security question at random, whereas a level 2 validation request may cause the application 104 to retrieve two security questions, at least one of which may be flagged as a more difficult question (e.g., "who is your mortgage provider" may be considered a more difficult security question than "what is your favorite color," because an attacker may be capable of guessing the latter, but would have a much more difficult time guessing the former).

The security question 218 may be transmitted to the application 104 in an encrypted format. The application 104 may be provided with a seed or other encryption information by the server 112 so that the application 104 can decrypt the incoming security questions.

Figure 2G:
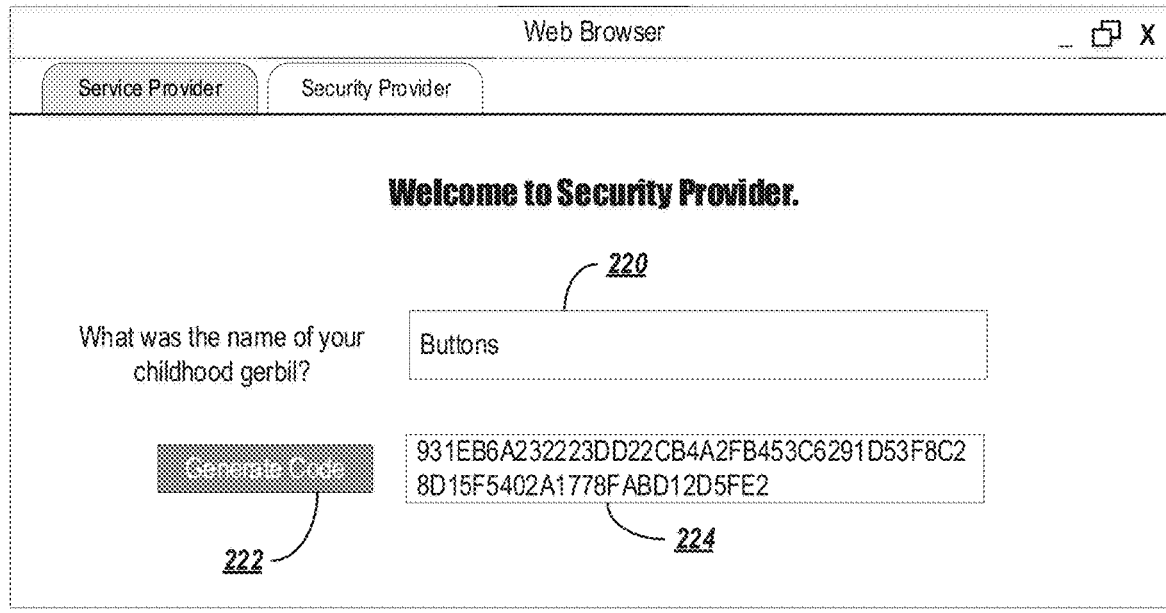

The user may enter their answer to the security questions in one or more provided fields 220. Once the user is satisfied with their answer, they may select an interactable element 222 that causes the answer to be obscured or encrypted. For example, selecting the interactable element 222 may cause a hash of the answer in field 220 to appear in field 224, as shown in FIG. 2G. From the field 224, the user can copy the obscured or encrypted answer (or, in some embodiments, the obscured or encrypted answer may be copied directly to the user's system clipboard for pasting).

Figure 2H:
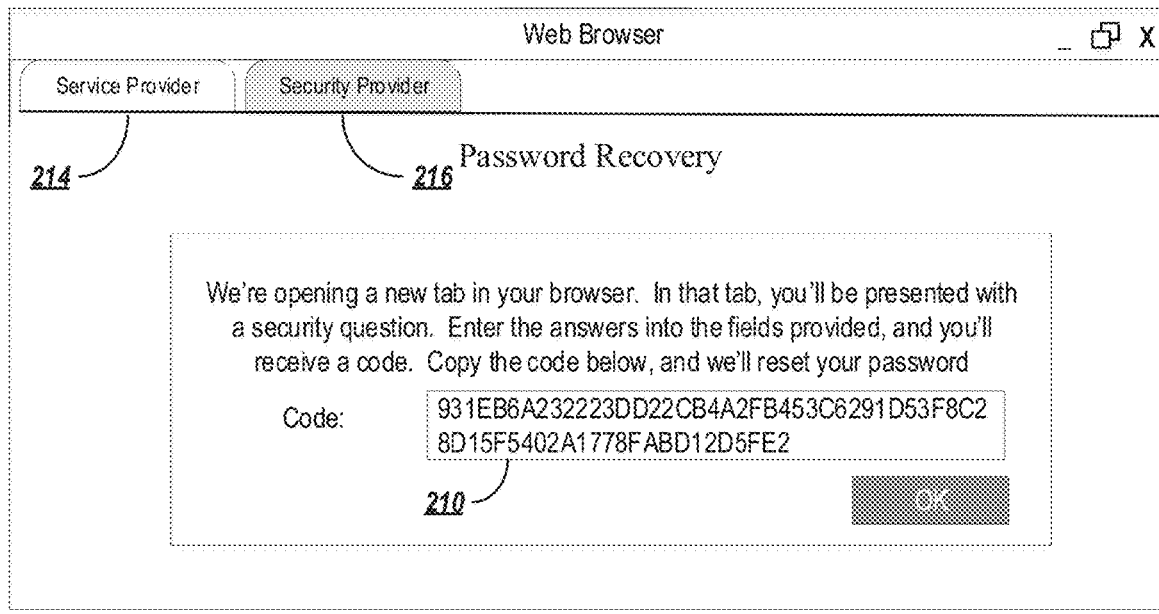

The user may then paste the obscured or encrypted answer into the field 210 of the service provider's interface, as shown in FIG. 2H. In some embodiments, the application 104 may automatically enter the obscured or encrypted answer into the field 210, without the need for user interaction.

If more than one question is presented in the security interface of FIG. 2F, the questions may be identified using a generic identifier (e.g., "Question 1: What is the name of your childhood gerbil?"). When the user copies the obscured or encrypted answer and enters the answer in the field 210, as shown in FIG. 2H, the field 210 may be identified using the generic identifier (e.g., "Enter your answer to Question 1 here," etc.). If multiple security questions are used, the application 104 may identify which answers correspond to which questions, based on the generic identifier or some other information such as question ordering.

Security questions may be stored in a particular order in the immutable log 114; however, questions may be retrieved at random or out-of-order for presentation in the interface of FIG. 2F. Similarly, the answers may arrive back at the security server 112 out-of-order. Accordingly, each question may be sent from the server 112 with an identifier. When an answer is entered, and a corresponding code is generated, the identifier may be embedded in the code so that the security server 112 can verify which question is being answered. In other embodiments, the security server 112 may check the answer against each of the security questions that was provided to determine if the answer matches any of the questions. Accordingly, it may not be necessary to identify which user-supplied answers correspond to which question; each answer may be checked against all possible questions to determine if it is possible that the user entered all answers correctly.

If the security provider determines that the user answered all questions correctly, the security provider may inform the service provider that the user has been validated, and that the service provider may proceed with any requested operations (e.g., password reset, account access, etc.).

Figure 3:
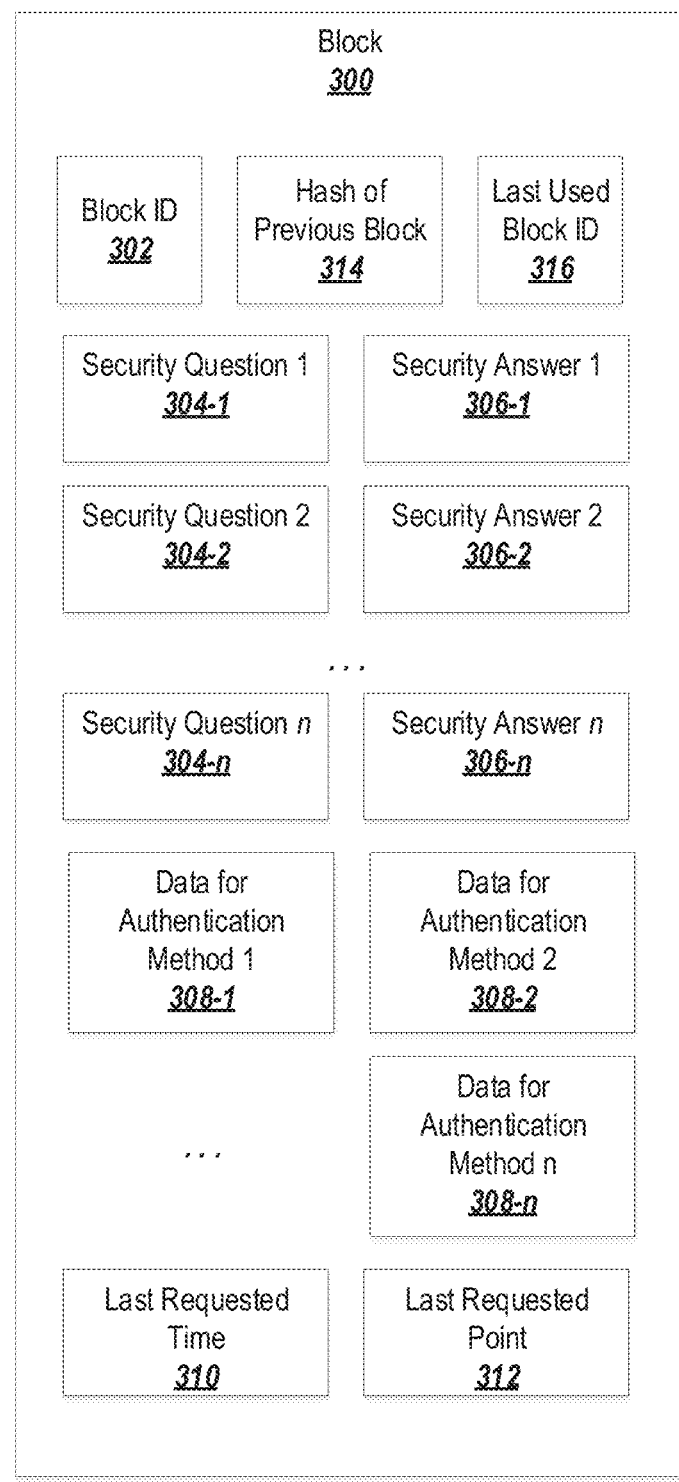
FIG. 3 is a data structure suitable for use with exemplary embodiments.

Turning to FIG. 3, an exemplary data structure 300 suitable for storing the security questions in the immutable log 114 according to exemplary embodiments is depicted. In this example, the immutable log 114 is a blockchain, and the data structure 300 is a block to be added to the blockchain.

The block may include a block identifier 302, which uniquely identifies the block within the blockchain. When the block is created, the block identifier 302 may be provided to the application 104 that created the block, so that the application 104 can retrieve the security questions associated with the block in the future. In some embodiments, the block and/or the security server may maintain a list of applications 104 associated with the user, so that the block information may be pushed out to multiple applications in the event that the user accesses the blockchain via more than one device. In other embodiments, access to the blockchain may be locked to a single application 104 at any given time; accessing the blockchain from a new application may require that the user log out of the previous application 104 and/or provide authorization (potentially from the previous application 104) to use a new application instance.

Each time a security question is used, added, removed, changed, etc., a new block with a new block identifier 302 may be created and added to the blockchain. The application 104 may be configured to use only the most-recent block in the blockchain, although the application 104 may keep a record of the other blocks associated with the user in the blockchain (e.g., previously used, created, deleted, or modified security questions) for purposes of auditing, as discussed below.

Alternatively or in addition, to facilitate auditing the block may optionally store the block ID 316 of the last block associated with the user. For example, if the user initially creates a security question that is stored in Block 1, then the last used block ID 316 may be empty. If the user subsequently uses the security question, thus creating a new Block 2, then the last used block ID 316 of Block 2 may include the block ID 302 of Block 1. This process may continue each time a new block is created, and thus it may be possible to identify each block in the chain associated with the user by following the last used block ID 316 of the most recent block back to the block before that, and so on until arriving at the initial block.

The block may further include a hash 314 of the previous block in the blockchain, as is commonly performed in blockchain technology.

The block may further include one or more security questions 304-$i$ and the answers 306-$i$ to the security questions. The security questions and answers may initially be added through the application 104 via an interface, such as the one depicted in FIGS. 2A-2B. If a security question is used and a new block is created, the security questions and answers from the previous incarnation of the block may be carried over to the new block. In some embodiments, any time a new block is created, the user may have the option of modifying, removing, or adding security questions.

As previously discussed, the security provider may rely on a number of authentication methods to access the security question (preferably non-password-based authentication methods, preferably at least two types of authentication methods, and preferably at least one type which is personal to the user and not based on information associated with a single device, in case the device is compromised). For each authentication method, expected authentication data 308-$i$ may be stored in the block.

The block may also store a last requested time 310 and a last requested point 312 for the security questions stored in the block. Each time a block is created (e.g., in response to the use of a security question, the creation of a new security question, the modification or deletion of a security question, etc.), the system may log the time that the block is created in the last requested time field 310 and the location associated with the block creation in the last requested point field 312. For example, if a new security question is added via the application 104, the last requested point field 312 may reflect the identity of the application (or may simply reflect that the user created a new security question on their device). If the security question is then used to request a password reset at the user's banking website, the last requested point field 312 may include the URL, name, or another identifier of the banking website.

If the user wishes to determine whether there have been any attempts to compromise the user's security questions, the user may transmit a request to audit the most-recent use of the security questions, in response to which the application 104 may pull the last requested time 310 and last requested point 312 of the current block associated with the user. Optionally, the user may check each use of the security questions by following the last used block ID 316 back in the chain, as discussed above.

Figure 4:
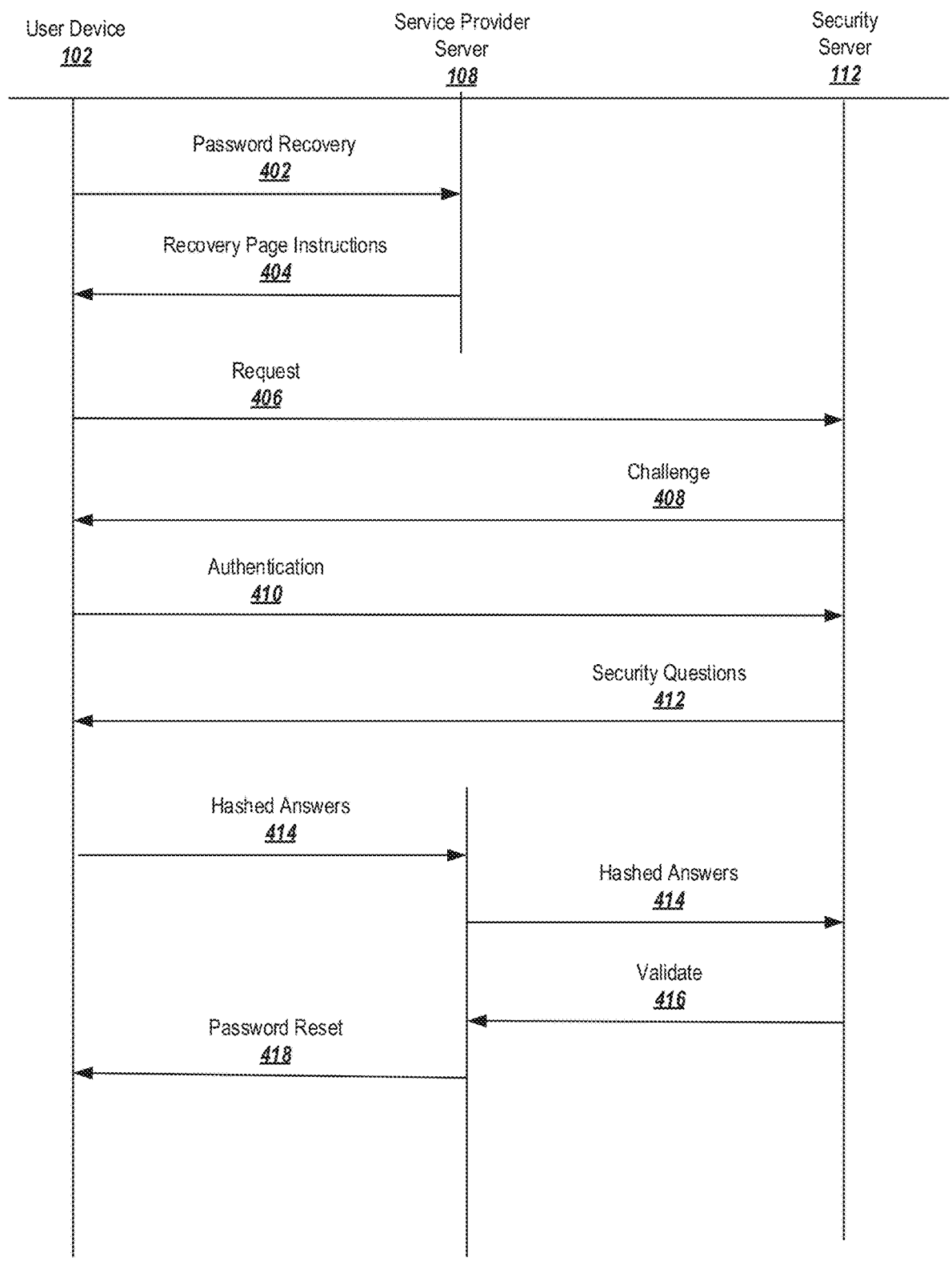
FIG. 4 is a data flow diagram depicting an exemplary process for using exemplary security questions.

The data structure 300 may be used in an exemplary authorization process, as shown in the data flow diagram of FIG. 4.

Initially, the user device 102 may request from the service provider server 108 that an action be taken that requires validation via the security questions. In the example depicted, the user device 102 transmits a password recovery request 402, although other types of actions may also be used. In response to the password recovery request 402, the service provider server 108 transmits instructions 404 for displaying a recovery page at the user device 102, such as the recovery page shown in FIG. 2D.

The instructions 404 may include instructions causing the application 104, which may be running the background on the user device 102, to prepare to retrieve the user's security questions. Accordingly, the application 104 may present an authentication interface, such as the one depicted in FIG. 2E, while the application 104 transmits a request 406 for the security questions to the security server 112. The request 406 may identify the user's most recently-created block, as reflected by the block identifier stored in the application 104. In some embodiments, the request 406 may identify the user instead of identifying the user's block, and the security server 112 may identify the most recent block in the chain associated with the user (e.g., by maintaining a database matching users to blocks). This may allow for the In response to receiving the request 406, the security server 112 may attempt to validate the user's identity using the authentication information stored in the user's block. Accordingly, the system may transmit a challenge 408 requesting the user's biometric data, device-specific information, etc.

In response to the challenge 408, the user's device 102 may gather the information, optionally providing additional interfaces for securing, e.g., biometric data, and transmit the authentication information 410 to the security server 112. Assuming the user is able to validate their identity, the security server 112 may respond by transmitting the security questions 412 back to the application 104 on the user's device 102.

Optionally, the application may transmit the authentication information 410 as part of the initial request 406, thus obviating the need for the challenge 408 and subsequent round of authentication information.

As discussed above, the user may view the security questions in an interface associated with the application, and may enter their answers, which may be obscured or encrypted by the application. The user then enters the obscured or encrypted answers into the service provider's interface, and thereby transmits the obscured or encrypted answers 414 to the service provider server 108. In turn, the service provider server 108 relays the obscured or encrypted answers 414 to the security server 112 and asks the security server 112 to validate that the answers are correct.

If the answers correspond to those stored in the immutable log 114, the security server 112 may transmit a validation instruction 416 to the service provider server 108 and, in response, the service provider server 108 may perform the originally requested action. In this example, the service provider server 108 resets the user's password and transmits instructions 418 allowing the user to select a new password.

Figure 5:
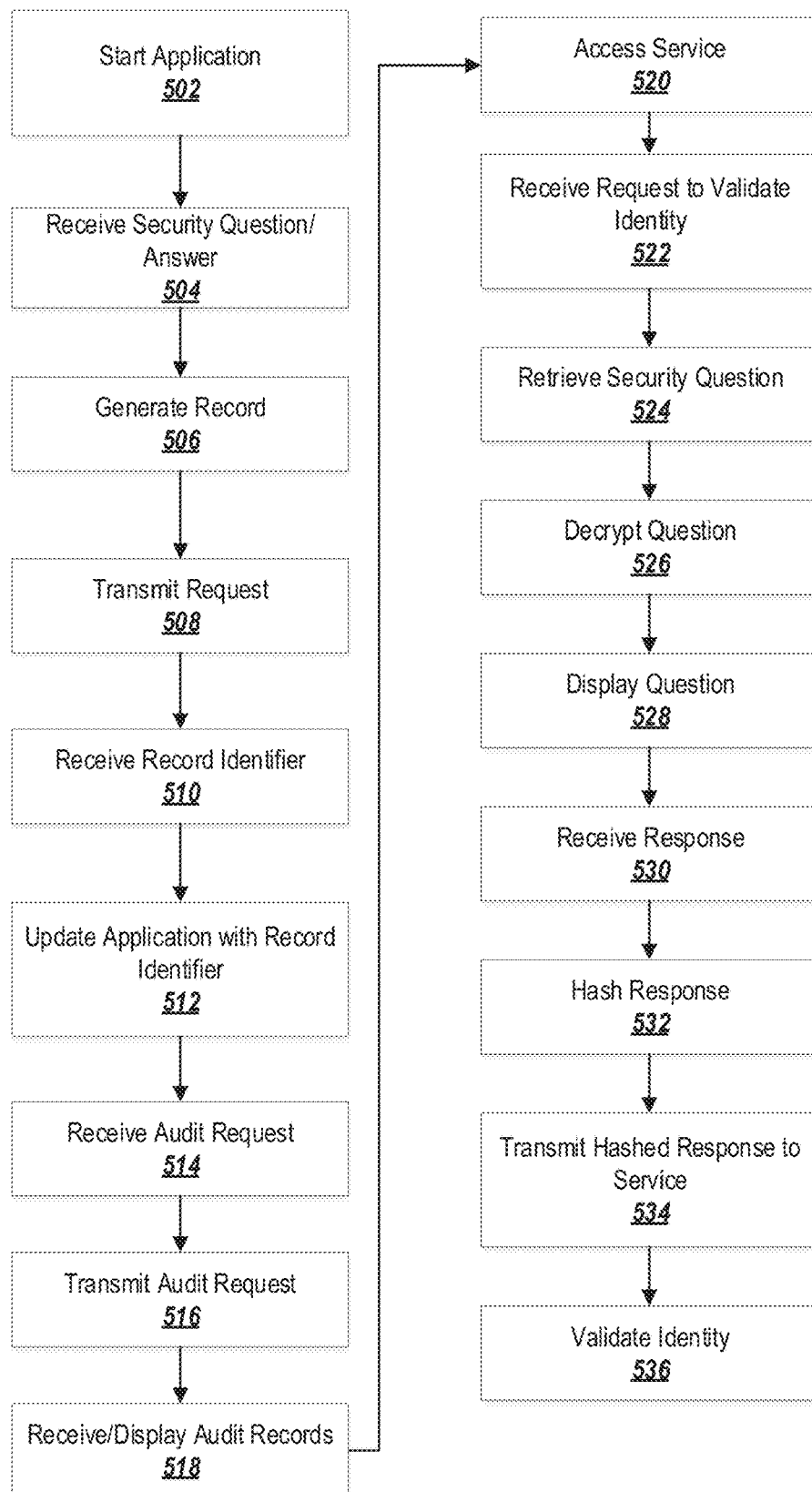
FIG. 5 is a flowchart depicting an exemplary client-side process for setting up and using a security question.
Figure 6:
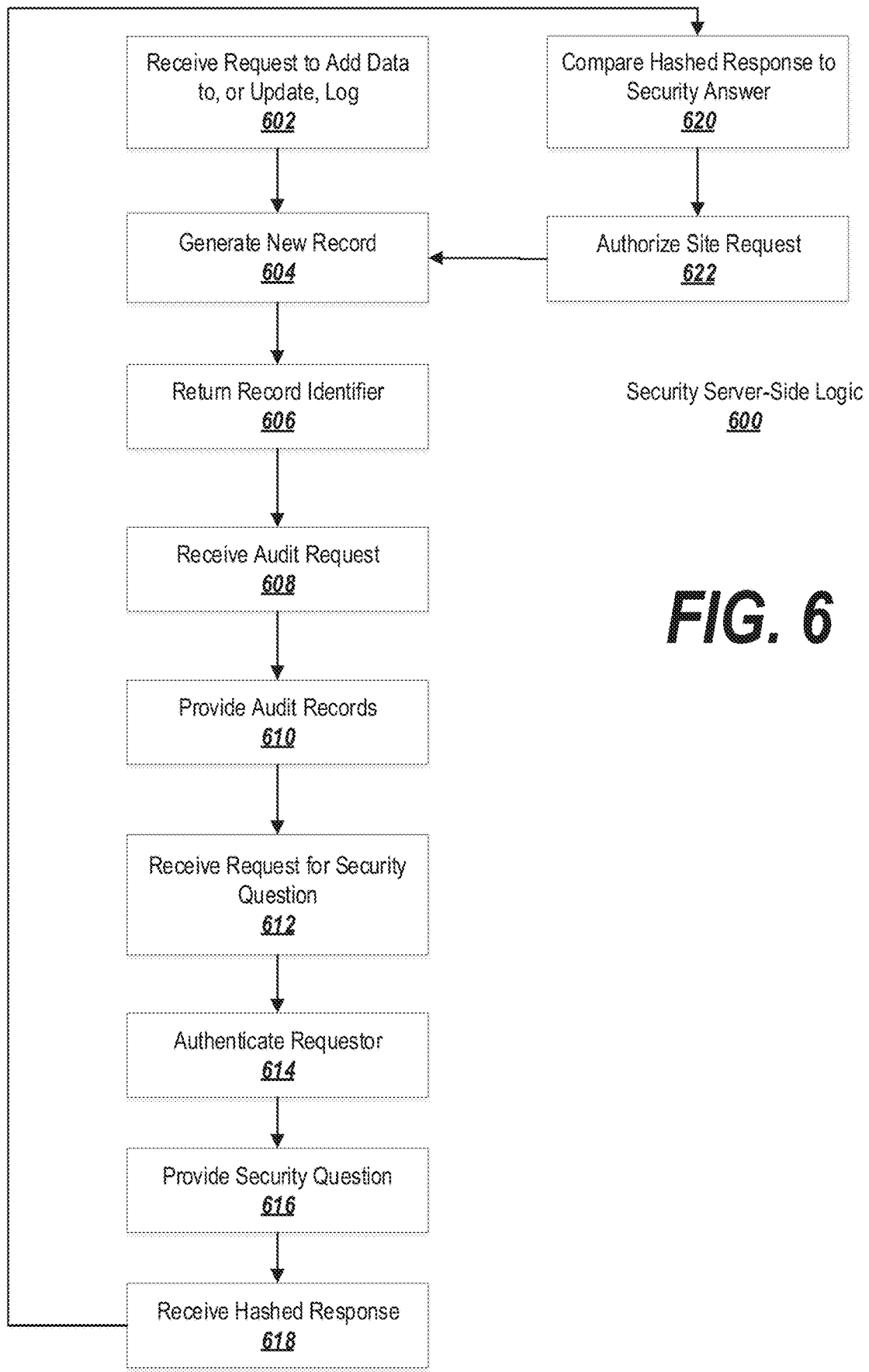
FIG. 6 is a flowchart depicting an exemplary server-side process for responding to requests for security questions.

The above-described process is but one exemplary embodiment, with particular steps performed in a particular order. One of ordinary skill in the art will recognize that more, fewer, or different steps may be performed, and the steps may be performed in a different order, while remaining within the scope of the invention. FIGS. 5-6 depict various embodiments from different perspectives to further elucidate the invention. Unless otherwise noted, it is contemplated that the logic and procedures described in FIGS. 5-6 may be used in combination with each other and/or in combination with the above-described embodiments.

FIG. 5 is a flowchart depicting logic 500 for performing an exemplary process for creating and using security questions from the perspective of a client device 102.

At block 502, the device may run an application configured to interact with a centralized immutable log stored on a server. The application may be run in the background on the device. The immutable log may be a blockchain.

At block 504, the device may receive a security question associated with a user and an answer to the security question.

At block 506, the device may generate a record for storage in the immutable log, the record comprising the security question, the answer, and authentication information. The record may be a block to be added to a blockchain, and the record identifier may be a block identifier. In other embodiments, the record may include information to be added to the blockchain, where the security server actually creates the block and returns the block identifier. In either event, the record may also include an audit record indicating a time that the record was last requested, and a source associated with the request for the record. The authentication information may include information that allows the user to be authenticated using at least two different authentication methods.

At block 508, the device may transmit a request to the server to add the record to the immutable log.

At block 510, the device may receive a record identifier for the record in the immutable log, if the server was tasked with creating a record in the immutable log (e.g., adding a block to the blockchain) rather than the client device. Alternatively, if the client device is responsible for creating and adding the record, the security server may respond with an acknowledgement that the record has been successfully created. The application may further receive a seed identifier allowing the application to decrypt information stored in the immutable log.

At block 512, the device may update the application with the record identifier. The updating may configure the application to retrieve the security question from the immutable log in response to a request to validate an identity of the user.

At block 514, the device may receive a request to audit the records in the immutable log. Accordingly, at block 516, the device may transmit an audit request to the security server, and at block 518 may receive the audit record and display the audit record on a display device.

At block 520, the device may access a service provided by a service provider. For example, the service may be a web site for which a password associated with a user is required.

At block 522, the device may receive a request to validate the identity of the user. For example, the user may indicate that they need to reset a password of the user at the website.

At block 524, the device may retrieve a question from the blockchain using the procedures described above in connection with FIGS. 2A-4. The question may be retrieved in an encrypted form, and therefore at block 526 the question may be decrypted (e.g., using the seed information provided at block 510).

At block 528, the device may display the question in an interface, and at block 530 a response to the question may be received in the interface. At block 532, the application may obscure or encrypt the answer, such as by hashing the answer.

The user may enter the hashed answer into the service provider's interface, and the hashed response may be transmitted to the security service at block 534. At block 536, the system may receive validation that the user's answers match the answers stored in the immutable log and that the action requested from the service provider (e.g., resetting the password) has been or may be carried out FIG. 6 is a flowchart depicting logic 600 for performing an exemplary process for creating and using security questions from the perspective of a server device 112.

At block 602, the device may receive a request to add data to a blockchain. The data may include a query (e.g., a security question) and a response to the query (e.g., an answer to the security question). The request may be associated with identity validation information (e.g., authentication information) for validating an identity of an originating user associated with the response to the query.

At block 604, the device may generate a new block in the blockchain, the new block storing the data. The new block may include a time and a location associated with the creation of the block, as discussed above in connection with FIG. 3. At block 606, the device may return a block identifier associated with the new block back to the entity that originated the request in block 602 (e.g., the application running on the user device).

At block 608, the device may receive a validation request to validate when the query was most recently applied or created. At block 610, the device may respond to the validation request with the time and the location.

At block 612, the device may receive a request for the record stored in the new block, the request associated with a site request and providing a validator record (e.g., authentication information allowing the user's identity to be validated). At block 614, the device may compare the validator record to the identity validation information stored in the block to determine if the two records match. When the validator record matches the identity validation information, the device may respond to the request for the new block with an encrypted version of the query at block 616.

At block 618, the device may receive a hashed response to the query, and at block 620 may compare the received hashed response to a hashed version of the response stored in the blockchain. If the received hashed response matches the hashed version of the response stored in the blockchain, the device may, at block 622, authorize the site request.

Processing may then return to block 604, where a new block may be created in response to the use of the security question in blocks 616-622. The time at which the new block is created may be logged, and the location associated with the use of the security question (e.g., the site originating the site request) may be stored in the new block with the time. The new block thus created may be used in place of the new block for a future request for the query.

In the future, a new request may be received to update the query or the response to the query, in which case the record may be updated, and a new block may be created as outlined at blocks 604-606.

Figure 7:
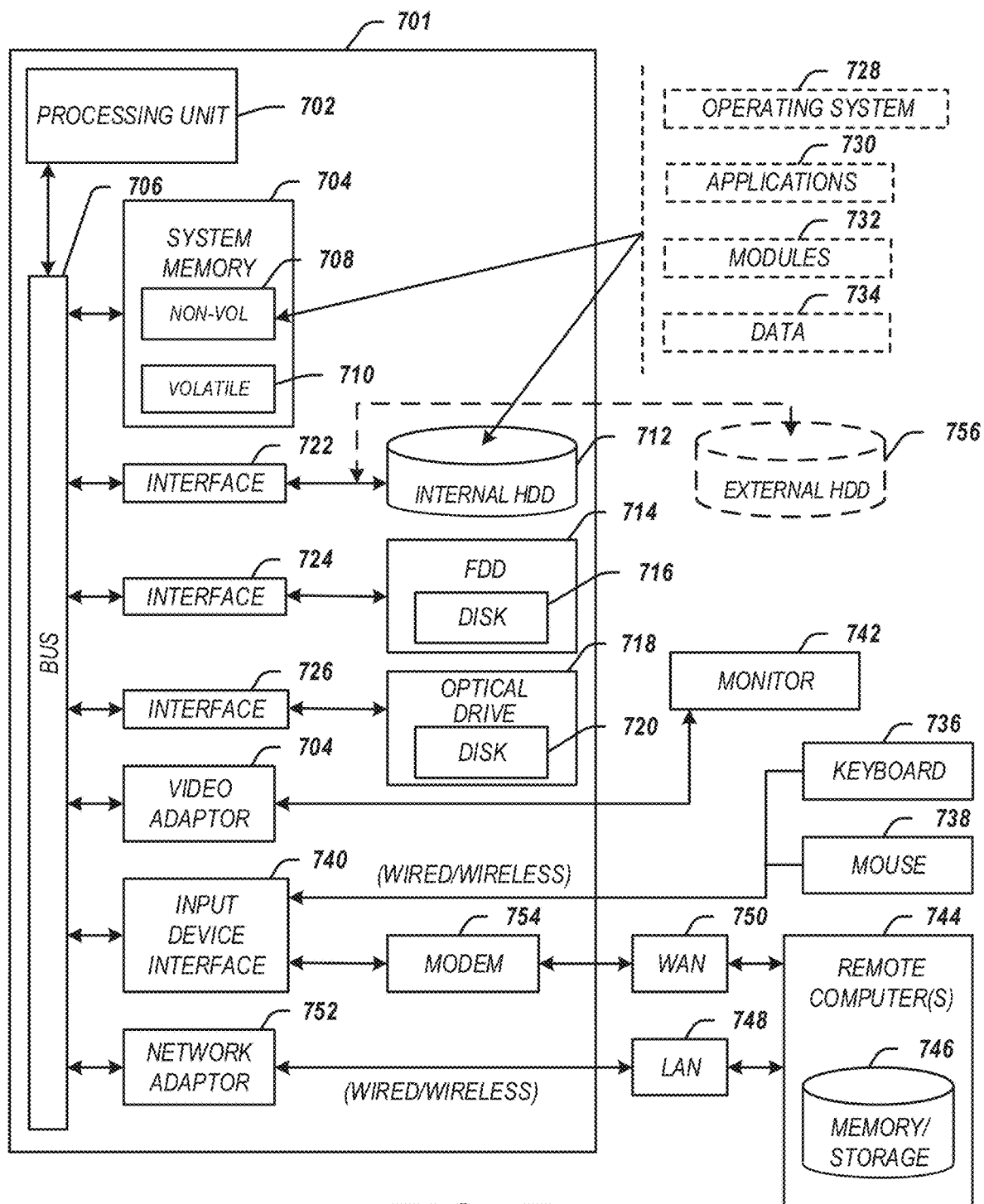
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, 756, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
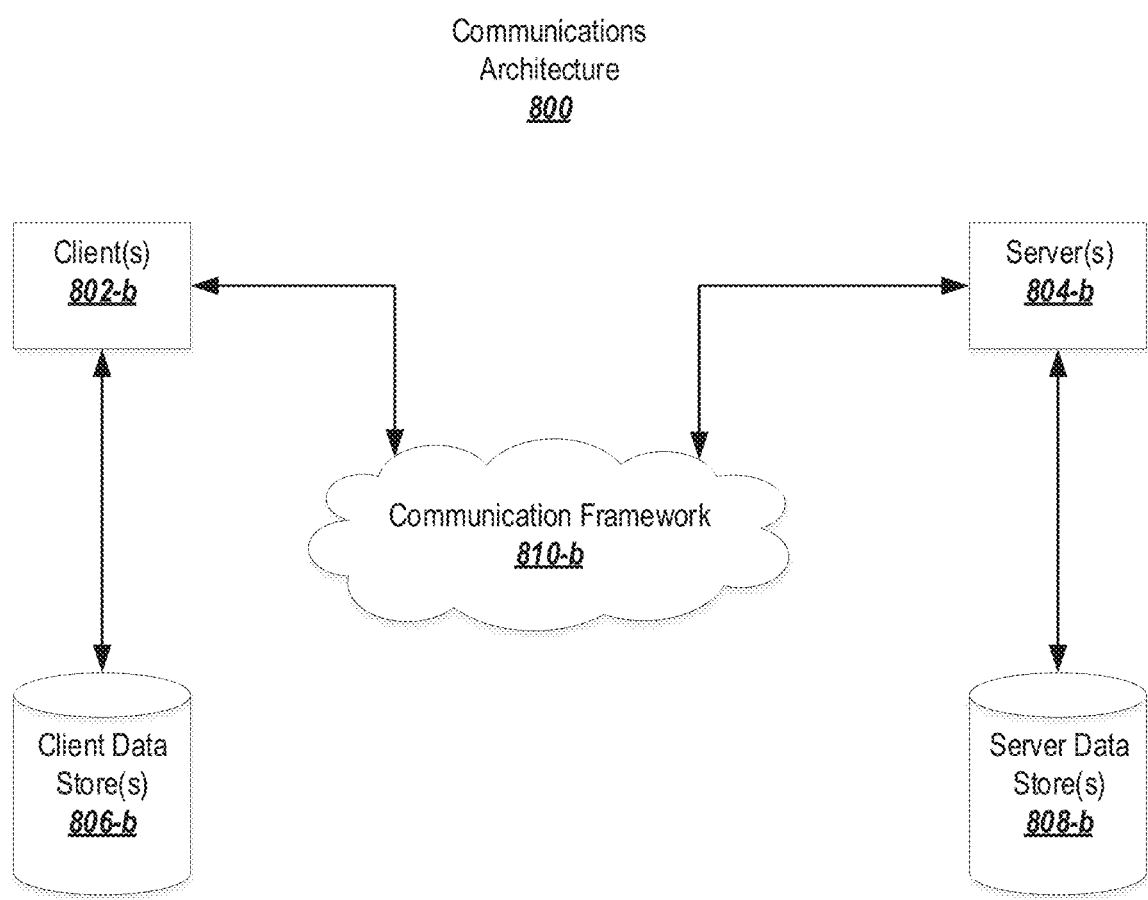
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device described above. The servers 804 may implement the server device descried above. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A non-transitory computer-readable medium storing instructions that, when executed, cause one or more processors to:
   execute an application configured to interact with a centralized immutable log stored on a server;
   receive a security question associated with a user and an answer to the security question;
   generate a record for the centralized immutable log, the record comprising the security question, the answer, and authentication information;
   transmit a request to the server to add the record to the centralized immutable log;
   receive a record identifier for the record in the centralized immutable log, wherein the centralized immutable log is a blockchain, the record is a block in the blockchain, and the record identifier is a block identifier;
   update the application with the record identifier, the update to configure the application to retrieve the security question from the immutable log in response to a second request to validate an identity of the user.

2. The medium of claim 1, wherein the authentication information allows the user to be authenticated using at least two different authentication methods.

3. The medium of claim 1, wherein the record further comprises an audit record indicating a time that the record was last requested and a source associated with a last request for the record.

4. The medium of claim 3, further storing instructions for retrieving the audit record and displaying the audit record on a display device.

5. The medium of claim 1, wherein the application further receives a seed identifier allowing the application to decrypt information stored in the centralized immutable log.

6. The medium of claim 1, wherein the request to validate the identity of the user is received in response to a request to reset a password of the user at a website that relies on the centralized immutable log to provide the security question.

7. A computer-implemented method, comprising:
   executing, by a processor, an application configured to interact with an immutable log stored on a server;
   receiving, by the processor via one or more interfaces, a security question associated with a user and an answer to the security question;
   generating, by the processor, a record for the immutable log, the record identified by a record identifier and the record comprising the security question, the answer, and authentication information, wherein the immutable log is a blockchain, the record is a block in the blockchain, and the record identifier is a block identifier;
   communicating, by the processor and via one or more interfaces, with the server to add the record to the immutable log stored on the server; and
   receiving, by the processor and via the one or more interfaces, an acknowledgement that the record has been successfully.

8. The method of claim 7, wherein the authentication information allows the user to be authenticated using at least two different authentication methods.

9. The method of claim 7, wherein the record further comprises an audit record indicating a time that the record was last requested and a source associated with the request for the record.

10. The method medium of claim 9, further storing instructions for retrieving the audit record and displaying the audit record on a display device.

11. The method of claim 7, comprising receiving, by the processor, a seed identifier allowing the application to decrypt information stored in the immutable log.

12. An apparatus, comprising:
    a network interface configured to interact with a server storing a blockchain;
    a non-transitory computer-readable medium storing instructions for a client-side program;
    a hardware processor circuit to execute the instructions, the instructions when executing, to cause the hardware processor circuit to:
    cause interaction with an immutable log stored on the server;
    receive a security question associated with a user and an answer to the security question;
    generate a record for the immutable log, the record comprising the security question, the answer, and authentication information;
    transmit a request to the server to add the record to the immutable log;
    receive a record identifier for the record in the immutable log, wherein the immutable log is the blockchain, the record is a block in the blockchain, and the record identifier is a block identifier;
    update the client-side program with the record identifier, the update to configure the client-side program to retrieve the security question from the immutable log in response to a second request to validate an identity of the user.

13. The apparatus of claim 12, wherein the authentication information allows the user to be authenticated using at least two different authentication methods.

14. The apparatus of claim 12, wherein the record further comprises an audit record indicating a time that the record was last requested and a source associated with a last request for the record.

15. The apparatus of claim 14, the hardware processor circuit to retrieve the audit record and cause displaying the audit record on a display device.

16. The apparatus of claim 12, wherein the client-side program further receives a seed identifier allowing the client-side program to decrypt information stored in the immutable log.

17. The apparatus of claim 12, wherein the request to validate the identity of the user is received in response to a request to reset a password of the user at a website that relies on the immutable log to provide the security question.

* * * * *